(No Model.)

N. LAMB.
SELF CLEARING SCREEN FOR DITCHES.

No. 597,241. Patented Jan. 11, 1898.

Witnesses,

Inventor,
Newton Lamb
By Dewey & Co.
Attys

UNITED STATES PATENT OFFICE.

NEWTON LAMB, OF YREKA, CALIFORNIA.

SELF-CLEARING SCREEN FOR DITCHES.

SPECIFICATION forming part of Letters Patent No. 597,241, dated January 11, 1898.

Application filed September 13, 1897. Serial No. 651,462. (No model.)

*To all whom it may concern:*

Be it known that I, NEWTON LAMB, a citizen of the United States, residing at Yreka, county of Siskiyou, State of California, have invented an Improvement in Self-Clearing Screens for Ditches; and I hereby declare the following to be a full, clear, and exact description of the same.

My invention relates to a self-clearing screen for ditches and water-courses; and it consists in a series of vertical bars or teeth rigidly fixed at their lower ends to a horizontal rod, a series of curved revolving teeth fixed spirally on a shaft and adapted to pass between the vertical teeth, a sprocket-chain and gear connecting the said shaft with a driving-shaft provided with floats or buckets, both shafts being journaled on an open sluice-box in which the said mechanism is placed, the said spiral teeth being rotated by a stream of water passing through the sluice-box and against the floats.

In those parts of the country where irrigation and pisciculture both prevail it is found that large numbers of young fish find their way into the irrigation-ditches and thence onto the irrigated lands, where they perish, thus causing great loss and needless expense in the operations of the pisciculturist. Fir cones, chips, and other refuse also float into these ditches and in course of time choke them, so that they have to be cleaned out much more frequently than would otherwise be necessary. The objects of my invention are to provide an effective, self-acting, cheap, and durable means by which both the fish and the floating refuse referred to may be prevented from entering said ditches.

Figure 1:
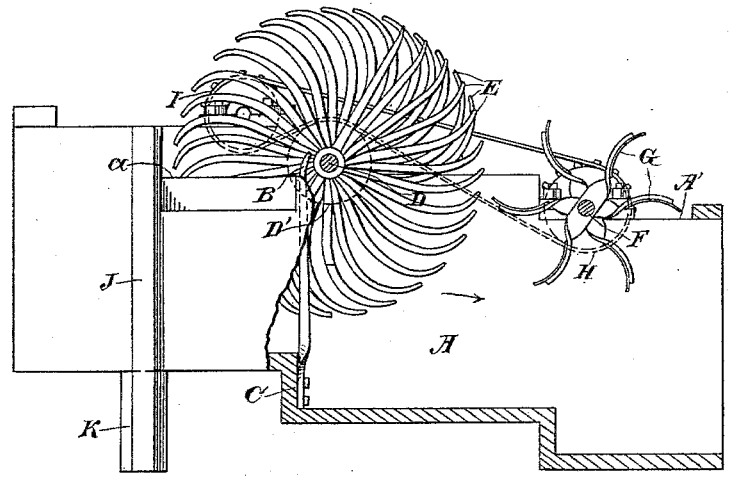
Figure 2:
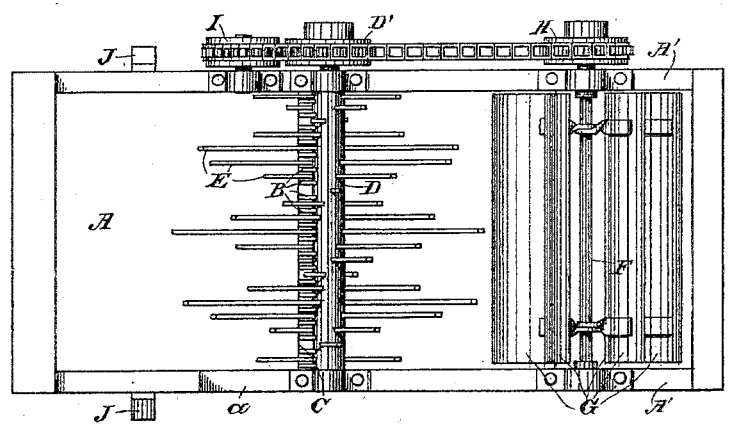

Referring to the accompanying drawings, Figure 1 is a side elevation and partial section of a sluice-box containing my device. Fig. 2 is a plan view of the same.

A is an open sluice-flox.

B is a series of vertical bars or teeth rigidly fixed at regular intervals to a rod C, extending across the bottom of the box A and having their upper ends pointed and slightly curved toward the shaft D, which is journaled on the sides of the box A at a suitable distance from the teeth B. On this shaft D is fixed spirally a series of curved tines or arms E at such distances apart that they will pass between the vertical teeth B. In actual use I have found it most effective to have the teeth and tines one-eighth of an inch thick and three-eighths of an inch apart, so as to leave a space of one-eighth of an inch between the teeth and the tines on each side, as the tines when revolving pass the teeth as when fish have been liberated from their nurseries they are too large to get through a space of three-eighths of an inch.

To one end of the shaft D the sprocket-wheel D' is securely fixed. At a convenient distance from the shaft D the upper edges of the box A are cut down a suitable depth corresponding with the step A', and on these edges the shaft F is journaled. This shaft is provided with the floats G, curved so as to receive the force of the water in the most effective manner, and is also provided with the sprocket-wheel H on the outer end, which is connected by a sprocket-chain passing over the idler I and engaging with the upper teeth of the wheel D', thus causing the shaft D, carrying the tines E, to revolve in a direction opposite to that of the shaft F. The spiral set of the tines E causes them to guide floating objects to one side of the box A, and their backward rotation enables them to raise such objects from the surface of the water and direct them over the embrasure $a$ in the side of the box A, and so out of the box and onto the ground or to any suitable receiver.

In order that my invention should operate to the best advantage, the box A should be nearly full of water, but not overflowing at any point, though it will operate with good results if the box be only half-full of water, or even with only enough water to drive the machinery. The embrasure $a$ is preferably lined with tin or any suitable material affording a smooth surface, so that the refuse will more readily slide over it and out of the box. The box is provided with cleats J wide enough to reach the banks of the ditch on each side and a transverse block K, extending across the bottom and meeting the projecting ends of the cleats J. When my screen is placed in position in a ditch, earth is packed in tightly behind these cleats and block, so that all the water flowing in the ditch must pass through the sluice-box.

Having thus described my invention, what

I claim as new, and desire to secure by Letters Patent, is—

1. In a ditch-screen, a sluice-box, a row of vertical rods fixed across the bottom of the box, a shaft provided with one or more rows of tines and journaled across the top of the box and means for rotating such shaft.

2. In a ditch-screen, an open sluice-box, a row of vertical rods rigidly fixed across the bottom of the box, a shaft journaled across the top of the box and provided with curved tines set spirally on the shaft and means for rotating such shaft.

3. In a ditch-screen, an open sluice-box, a row of vertical rods rigidly fixed across the bottom of the box, a shaft journaled across the top of the box and provided with curved tines set spirally on the shaft, a second shaft also journaled across the top of the box and provided with floats adapted to be driven by a stream of water flowing through the sluice-box and means for transmitting power from the driving-shaft to the other one.

4. In a ditch-screen an open sluice-box, a row of vertical rods rigidly fixed across the bottom of the box at regular intervals, a shaft journaled across the top of the box and provided with curved tines set spirally on the shaft and adapted to rotate between the vertical rods, a driving-shaft also journaled across the top of the box and provided with floats adapted to be driven by a stream of water flowing through the sluice-box, sprocket-wheels fixed to the corresponding ends of said shafts, an idler journaled on the side of the box and a sprocket-chain connecting said wheels and idler, the chain engaging the upper teeth of the following sprocket-wheel.

5. In a ditch-screen, the combination of an open sluice-box having a frame fastened near its forward end and adapted to fit the sides and bottom of the ditch so as to prevent the passage of water otherwise than through the sluice-box with a row of vertical rods fixed across the bottom of the box, a shaft journaled across the box and provided with one or more rows of tines and means for rotating said shaft.

In witness whereof I have hereunto set my hand.

NEWTON LAMB.

Witnesses:
J. T. DOYLE,
GEORGE DURAND.